Jan. 20, 1959 W. HONOLKA 2,870,257

ELECTRICAL SIGNAL TRANSMISSION

Filed July 23, 1956

INVENTOR:
Walter Honolka
BY: Michael S. Striker
Agt.

United States Patent Office 2,870,257

Patented Jan. 20, 1959

2,870,257

ELECTRICAL SIGNAL TRANSMISSION

Walter Honolka, Stuttgart, Germany, assignor to Firma Bölkow Entwicklungen Kommanditgesellschaft, Stuttgart, Germany Application July 23, 1956, Serial No. 599,412

Claims priority, application Germany July 23, 1955

10 Claims. (Cl. 179—1.5)

The present invention relates to a method and apparatus for transmitting and receiving electrical signals. More particularly, the present invention relates to a method and apparatus for transmitting messages in the form of electrical signals in such manner that the messages cannot be understood by unauthorized receivers.

There are many occasions wherein messages in the form of electrical signals must be sent long distances either through wires or through a form of wireless apparatus to distant stations. In such instances quite often these messages contain valuable information which should not be available to unauthorized listeners. It is conventional practice to scramble the message in such manner that the message is unintelligible to unauthorized receivers and to unscramble the message in a receiver at an authorized station.

Conventional apparatus for scrambling the electrical signals constituting the messages are usually complicated apparatus which must be repeated both at the transmitting station and at the receiving station. On the other hand, the present invention provides a substantially foolproof method of scrambling and unscrambling messages between authorized transmitting and receiving stations without the possibility of such messages being intercepted and unscrambled by unauthorized stations.

It is an object of the present invention to provide a new and improved method and apparatus for transmitting and receiving messages in the form of electrical signals.

A second object of the present invention is to provide a new and improved method and apparatus for transmitting and receiving information in such manner that the intercepted information will be rendered unintelligible to unauthorized interceptors.

Another object of the present invention is to provide a new and improved method and apparatus for scrambling a message in the form of electrical signals to be transmitted and unscrambling the message in a predetermined manner at an authorized receiver.

Still another object of the present invention is to provide such method and apparatus which is simple to fabricate and operate and which can be constructed in an inexpensive manner.

Yet another object of the present invention is to provide a new and improved apparatus and method for transmitting and receiving the information in the form of electrical signals wherein the information is first recorded on a record carrier and modulated at the transmitting station and wherein the transmitted electrical signal is recorded at the receiving station and demodulated there to render the transmitted information intelligible.

With the above objects in view, the present invention mainly consists of an apparatus for the transmission and reception of electrical signals, including first recording means for recording the electrical signals to be transmitted, a reproducing and modulating means for reproducing and modulating the recorded electrical signals, a second recording means for recording the reproduced and modulated signals at the receiving station and a reproducing and demodulating means for reproducing and demodulating the electrical signals received at the receiving station.

In a preferred embodiment of the present invention the electrical signals containing the information to be transmitted are recorded and reproduced twice at the transmitting station before the scrambled signals are transmitted.

In yet another preferred embodiment, in addition to recording and reproducing the electrical signals at the transmitting station, an inverter is provided which mixes electrical signals emanating from a separate generator with the electrical signals containing the information to be transmitted. In this manner, additional scrambling is provided at the transmitting station.

In yet another preferred embodiment of the present invention, at the transmitting and receiving stations respectively, the electrical signals containing the information to be transmitted are recorded on a record carrier and reproduced. This reproduced electrical signal is mixed with a previously recorded and reproduced electrical signal emanating from an oscillator for the purpose of rendering the information contained in the electrical signal unintelligible.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figures 1, 2, 3:
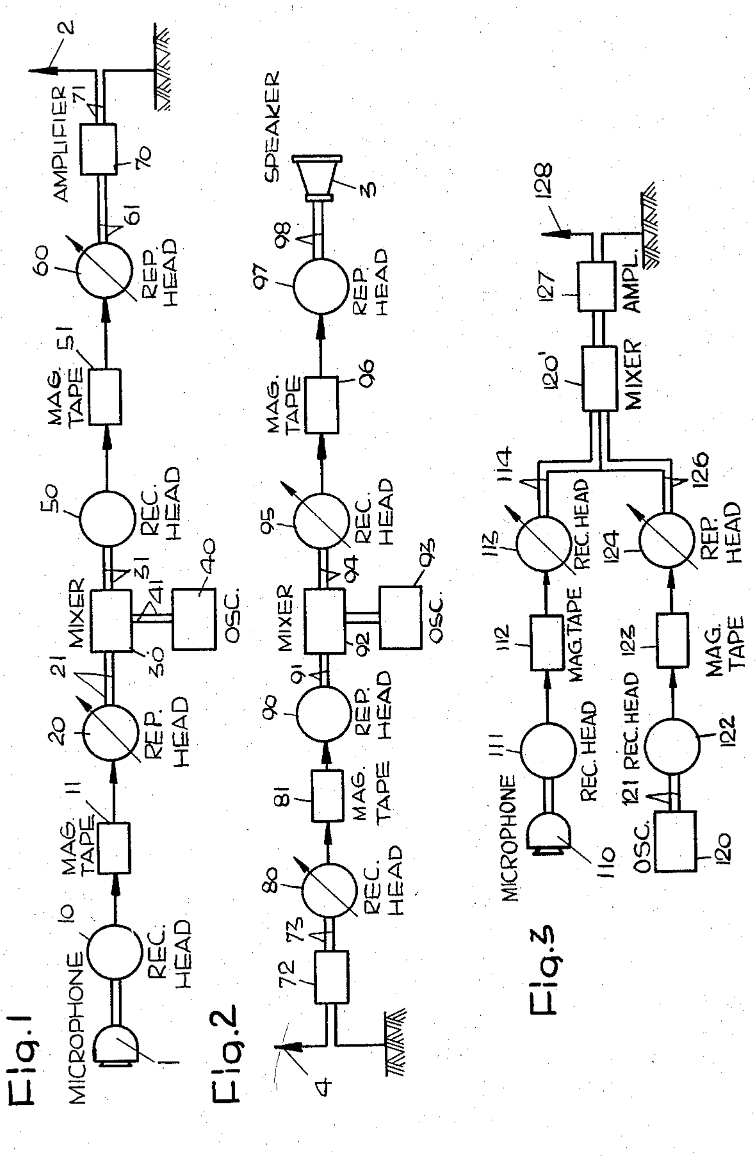
Fig. 1 is a block diagram of a transmitting station constructed in accordance with the present invention.
Fig. 2 is a block diagram of a receiving station adapted to receive and decode information transmitted by the transmitting station of Fig. 1.
Fig. 3 is a block diagram of a transmitting station constructed in accordance with a second embodiment of the present invention.

Referring to the drawings and more particularly to Fig. 1, it can be seen that at the transmitting station a microphone 1 is provided and has an output connected to a recording head 10. The recording head 10 is a fixed recording head which is constructed in a conventional manner and is adapted to record electrical signals emanating from the microphone 1 onto the magnetic tape 11.

That is, in a conventional manner, the magnetic tape 11 is adapted to move adjacent the stationary recording head 10 so that the recording head 10 can magnetize the magnetic tape 11 in a manner dependent upon the electrical signals being emanated from the microphone 1 and controlling the recording head 10. The magnetic tape 11 is also adapted to move past a reproducing head 20. The reproducing head 20 is also constructed in a conventional manner except that this head is not mounted in a stationary position as is the recording head 10. That is, a mechanical member is provided to impart an oscillatory motion to the reproducing head 20 with respect to the movement of the tape 11. This oscillatory motion can be an irregular type of motion produced by a cam means having a predetermined cam track pattern.

Therefore, as the reproducing head 20 reproduces the electrical signals recorded on the magnetic tape 11, these electrical signals are modulated by the oscillatory motion of the reproducing head 20. The modulation pattern to which the electrical signals reproduced by the head 20 are subjected depends on the pattern of motion of the reproducing head with respect to the moving magnetic tape 11.

The modulated electrical signals which are reproduced by the reproducing head 20 are applied on conductors 21 to one input of a mixer 30. Connected to a second input of the mixer 30 on conductors 41 is the output of an oscillator 40. The oscillator 40 provides a constant frequency electrical signal which is heterodyned in the mixer 30 with the modulated signals applied on the conductors 21. The such produced frequency band is inverted within the mixer in a known manner.

Accordingly, at the output of the mixer on conductors 31 appears electrical signals which have been modulated and mixed with the output signals from the oscillator 40 and inverted. These heterodyned inverted electrical signals are applied to a second recording head 50 which is also a stationary recording head. Adapted to move past the stationary recording head 50 is a second magnetic tape 51 which is magnetized by the recording head 50 in a manner responsive to the electrical signals applied to the recording head.

The magnetic tape 51 also moves past a second reproducing head 60. This reproducing head 60 is not stationary but moves with an oscillatory motion produced preferably by mechanical cam means in a manner similar to the cam means for moving the reproducing head 20. Ttherefore, the electrical signals reproduced by the reproducing head 60 possesses an additional modulation introduced by the oscillatory motion of the reproducing head 60. These last reproduced signals emitted from the reproducing head 60 are applied on conductor 61 to the input of an amplifier 70 and from the amplifier 70 they are connected to output conductor 71 to an antenna 2.

Therefore transmitted from the transmitting station of Fig. 1 on the antenna 2 is the information contained in the original electrical signals produced by the microphone 1 and corresponding to the sound waves picked up by the microphone. The electrical signals transmitted from the antenna 2 of the transmitting station have been scrambled first by the reproducing head 20 which is moved with an oscillatory motion with respect to the magnetic tape 11. The modulated electrical signals produced at the reproducing head 20 is heterodyned in the mixer 30 with the signals emanating from the constant frequency oscillator 40 and inverted so that the output of the mixer 30 on the conductors 31 can be made to occupy substantially any desired frequency band depending on the heterodyning frequency emitted from the oscillator 40.

The modulated, heterodyned and inverted signals applied to the recording head 50 are recorded on the second magnetic tape 51 and reproduced by the reproducing head 60 with the additional modulation provided by the oscillatory motion of the reproducing head 60. These amplified signals are then transmitted from the antenna 2 of the transmitting station.

Referring now to Fig. 2 the apparatus at the receiving station will be described and the method for unscrambling or decoding the information contained in the electrical signals transmitted from the transmitting station. Of course it is apparent that the block diagram of Fig. 2 can be reproduced at a plurality of receiving stations so that the signals transmitted from the antenna 2 can be simultaneously picked up and received by such plurality of receiving stations.

The electrical signals transmitted from the antenna 2 are received at the receiving antenna 4 and applied to the input of an amplifier 72. The amplified signals emitted from the amplifier 72 are applied on conductors 73 to a recording head 80. The recording head 80 is adapted to record on a magnetic tape 81 which moves past the same. However, the recording head 80 is not a stationary recording head but rather is provided with an oscillatory motion which corresponds precisely and is synchronized with the oscillatory motion imparted to the reproducing head 60 of the transmitting station.

Therefore when the electrical signals are recorded on the magnetic tape 81 by the moving recording head 80, these electrical signals are demodulated and the effect of the last reproducing head 60 of the transmitting station is nullified so that the electrical signals recorded on the magnetic tape 81 are precisely the same as the electrical signals recorded on the magnetic tape 51 in the transmitting station.

The signals recorded on the magnetic tape 81 are reproduced in a reproducing head 90 which is a stationary reproducing head. Accordingly, the electrical signals reproduced by reproducing head 90 correspond exactly to the electrical signals emitted from the mixer 30 and applied to the recording head 50 of the transmitting station.

The reproduced and demodulated electrical signals emitted from the reproducing head 90 are applied on conductors 91 to a mixer 92. Connected to a second output of the mixer 92 is the output of an oscillator 93. The oscillator 93 provides a constant frequency which corresponds to the frequency of the oscillator 40 of the transmitting station.

Therefore, in the mixer 92 the signals reproduced by reproducing head 90 are treated with the output from the oscillator 93 in a known manner and the inversion of the mixer 30 in the transmitting station is thereby eliminated. That is, the signals are transposed back to the original frequency band from which they had been transposed by the mixer 30.

Therefore at the output of the mixer 92 is provided electrical signals which correspond precisely to the electrical signals emitted from the reproducing head 20 and applied to the mixer 30. These electrical signals are applied on conductors 94 to a recording head 95. The recording head 95 is mechanically moved with an oscillatory motion corresponding exactly and synchronized with the oscillatory motion of the reproducing head 20 in the transmitting station.

Therefore, the recording head 95 records on the magnetic tape 96, adapted to be moved past the recording head 95, electrical signals which are demodulated to eliminate the modulating effect of the moving reproducing head 20 in the transmitting station.

In this manner, the electrical signals recorded on the magnetic tape 96 correspond exactly to the electrical signals originally recorded on the magnetic tape 11 of the transmitting station. It should be noted that these are the electrical signals containing the information in unscrambled form as originally recorded by the recording head 10 and originated from the microphone 1 in the transmitting station.

Therefore, the electrical signals recorded on the magnetic tape 96 are merely reproduced by the stationary reproducing head 97 and the output thereof is applied on conductor 98 to the earphone or loudspeaker 3 in the receiving station. It is apparent that in the loudspeaker 3 of the receiving station, these electrical signals are transformed back into the original sound waves which had been picked up by the microphone 1 in the transmitting station. Accordingly the desired result has been accomplished. Namely, electrical signals containing information produced in a transmitting station have been scrambled in three different manners and transmitted. These scrambled electrical signals have been received by one or more of a plurality of authorized receiving stations and unscrambled in three different steps which are the reverse of the original scrambled steps. It is clear that such method of scrambling cannot be detected by unauthorized personnel. That is the oscillatory motions imparted to the reproducing head 20 and the reproducing head 60 in the transmitting station may be of any desired form and frequency. That is, an irregular cam pattern may be developed for moving the reproducing head 20 in a predetermined oscillatory manner. This motion can be completely irregular or regular as desired. Similarly, a completely different cam pattern may be developed for the reproducing head 60 so that this scrambling can be done in a second independent manner. In order to unscramble the signals transmitted from the transmitting station it is necessary to have exact duplicates of the oscillatory cam patterns developed for each of the movable reproducing heads in the transmitting station.

These oscillatory cam patterns must then be used at the recording heads in the receiving station and applied in the proper sequence to properly demodulate and unscramble the message. In addition, the frequency of the oscillator 40 must be known in order to transpose the reproduced electrical signals to the proper frequency zone.

It is apparent that so many different variations are possible in the production of the scrambling patterns that almost an unlimited number of variations can be used. It is therefore impossible for unauthorized personnel to reproduce the scrambled signals since it would be impossible for them to determine the form of the individual oscillatory patterns developed for the reproducing heads 20 and 60, respectively.

It is also clear that additional scrambling arrangements may be introduced in the transmitting station by providing additional independent record carriers such as the magnetic tapes 11 and 51 with attendant recording and reproducing heads. In addition, more oscillators and mixers may be provided to transpose the electrical signals into desired frequency zones.

It is of course clear that in the event the oscillator 40 and the mixer 30 are not used in the transmitting station, they are also not used in the receiving station of Fig. 2.

Referring now to Fig. 3 a second embodiment of apparatus capable of carrying out the method of the present invention will be described. In this figure, the sound waves picked up by the microphone 110 in the transmitting station are converted into electrical signals and applied to a recording head 111. This recording head is a stationary recording head and records the electrical signals produced by the microphone 110 on the magnetic tape 112.

Adjacent the moving magnetic tape 112 is a reproducing head 113 which is moved by a cam device which is not illustrated since such devices are well known. Accordingly, the reproducing head 113 reproduces the signals recorded on the magnetic tape 112 and adds thereto a modulation corresponding to the oscillatory pattern of movement of the reproducing head 113.

These reproduced and modulated signals are applied on the output conductors 114 to the input of a mixer 120.

Also provided in the transmitting station of Fig. 3 is an oscillator 120 which emits constant frequency signals on conductors 121 and applies the same to a stationary recording head 122. The recording head 122 records these constant frequency electrical signals on the magnetic tape 123.

The magnetic tape 123 is adapted to move past a reproducing head 124. The reproducing head 124 is also provided with an oscillatory motion which is different from the oscillatory motion provided for the reproducing head 113. Accordingly, at the output of the reproducing head 124 are provided electrically produced electrical signals which are modulated in a manner depending on the oscillatory motion imparted to the reproducing head 124. These reproduced and modulated signals are applied on output conductors 126 to the input of the mixer 120. In the mixer 120, the signals coming from the reproducing head 113, are inverted with respect to the wobbled frequency coming from the head 124 and the output is applied to the amplifier 127. These scrambled electrical signals, containing the information originally provided at the microphone 110 of the transmitting station are transmitted from the antenna 128 of the transmitting station.

The receiving station which is not illustrated is constructed in a manner similar to Fig. 2. That is, the receiving station corresponding to the embodiment of Fig. 3 provides just the reverse steps applied by Fig. 3. Therefore, an oscillator is provided corresponding to the oscillator 120 and recording heads are provided which are imparted with an oscillatory motion corresponding to the reproducing heads 113 and 124 to demodulate the received electrical signals in the manner opposite to the manner in which they were originally modulated.

It is apparent that the principles of the embodiment of Fig. 3 can be combined with the principles of the embodiment of Fig. 1 to provide further embodiments for scrambling transmitted electrical signals and unscrambling the same.

In another form of the apparatus, a generator provides a modulating electrical frequency which is heterodyned with the unscrambled electrical signals corresponding to the originally provided sound waves. If the frequency provided by the generator is in the audio range such heterodyning will render the electrical signals unintelligible to a listener. It has been found that for such generators a frequency of 3,000 cycles per second can advantageously be used.

As indicated hereinabove several different mechanical arrnagements can be provided for moving the recording and reproducing heads with a desired oscillatory motion. However a particularly advantageous form is described in my copending U. S. patent application Serial No. 599,506 filed on July 23, 1956, and No. 599,507, filed July 23, 1956.

Also, cam members may be provided to produce varying cam patterns, which patterns can be chosen by an operator so that one transmitting station may use different codes at different time periods for producing the scrambled signals. A particularly advantageous method of varying the oscillatory motions of the recording and reproducing heads is described in my copending U. S. patent application Serial No. 599,506 filed on July 23, 1956, and No. 599,507, filed on July 23, 1956.

It will be understood that each of the elements described above, or two or more together, may also find a useful application in other types of transmitting and receiving apparatus differing from the types described above.

While the invention has been illustrated and described as embodied in method and apparatus for transmitting and receiving information in the form of electrical signals, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a system for the transmission and reception of information by electrical signals, in combination, a transmitting station including a first record carrier adapted to have the electrical signals containing the information to be transmitted recorded thereon, first recording means for recording said electrical signals on said first record carrier, reproducing means for reproducing said recorded signals, said reproducing means being moved in a predetermined oscillatory manner with respect to said record carrier to modulate said reproduced signals in accordance with said predetermined oscillatory movement, and means adapted to transmit said reproduced and modulated signals; and at least one receiving station including a second record carrier adapted to have said transmitted signals recorded thereon, second recording means adapted to record said transmitted signals on said second record carrier, said second recording means being moved in said predetermined oscillatory manner with respect to said second record carrier to demodulate said transmitted signals and record said demodulated signals on said second record carrier, and reproducing means for reproducing said recorded and demodulated transmitted signals to provide the information transmitted by said electrical signals.

2. In a system for the transmission and reception of information by electrical signals, in combination, a transmitting station including first recording means for recording the electrical signals containing the information to be transmitted in a first frequency range, first reproducing and modulating means for reproducing and modulating said recorded signals, a first oscillator for producing constant frequency signals, first mixing means for mixing said reproduced and modulated signals with said constant frequency signals to transpose said reproduced and modulated signals to a second frequency range, and means adapted to transmit said transposed frequency signals; and at least one receiving station including a second oscillator for producing second constant frequency signals equal to said first produced constant frequency signals, second mixing means for mixing said transmitted and transposed signals with said second constant frequency signals for retransposing said transmitted signals back to said first frequency range, recording and demodulating means for recording and demodulating said retransposed signals, and reproducing means for reproducing said recorded and demodulated signals to provide the information transmitted by said electrical signals.

3. In a system for the transmission and reception of information by electrical signals, in combination, a transmitting station including first recording means for recording the electrical signals containing the information to be transmitted in a first frequency range, first reproducing and modulating means for reproducing and modulating said recorded signals, a first oscillator for producing constant frequency signals, first mixing means for mixing said reproduced and modulated signals with said constant frequency signals to transpose said reproduced and modulated signals to a second frequency range, second recording means for recording said transposed signals, second reproducing and modulating means for reproducing and further modulating said transposed signals and means adapted to transmit said further modulated signals; and at least one receiving station including first recording and demodulating means for recording and demodulating said transmitted frequency signals to provide said transposed frequency signals, reproducing means for reproducing said transposed frequency signals, a second oscillator for producing second constant frequency signals equal to said first produced constant frequency signals, second mixing means for mixing said transposed signals with said second constant frequency signals for retransposing said transmitted signals back to said first frequency range, second recording and demodulating means for recording and demodulating said retransposed signals, and reproducing means for reproducing said recorded and demodulated signals to provide the information transmitted by said electrical signals.

4. In a system for the transmission and reception of information by electrical signals, in combination, a transmitting station including a first record carrier adapted to have recorded thereon the electrical signals containing the information to be transmitted in a first frequency range, first recording means for recording said electrical signals on said first record carrier in said first frequency range, first reproducing means for reproducing said recorded signals, said first reproducing means being moved in a predetermined oscillatory manner with respect to said record carrier to modulate said reproduced signals in accordance with said predetermined oscillatory movement, a first oscillator for producing constant frequency signals, first mixing means for mixing said reproduced and modulated signals with said constant frequency signals to transpose said reproduced and modulated signals to a second frequency range, and means adapted to transmit said transposed frequency signals; and at least one receiving station including a second oscillator for producing second constant frequency signals equal to said first produced constant frequency signals, second mixing means for mixing said transmitted and transposed signals with said second constant frequency signals for retransposing said transmitted signals back to said first frequency range, recording and demodulating means for recording and demodulating said retransposed signals, and reproducing means for reproducing said recorded and demodulated signals to provide the information transmitted by said electrical signals.

5. In a system for the transmission and reception of information by electrical signals, in combination, a transmitting station including a first record carrier adapted to have recorded thereon the electrical signals containing the information to be transmitted in a first frequency range, first recording means for recording said electrical signals on said first record carrier in said first frequency range, first reproducing means for reproducing said recorded signals, said first reproducing means being moved in a predetermined oscillatory manner with respect to said record carrier to modulate said reproduced signals in accordance with said predetermined oscillatory movement, a first oscillator for producing constant frequency signals, first mixing means for mixing said reproduced and modulated signals with said constant frequency signals to transpose said reproduced and modulated signals to a second frequency range, and means adapted to transmit said transposed frequency signals; and at least one receiving station including a second oscillator for producing second constant frequency signals equal to said first produced constant frequency signals, second mixing means for mixing said transmitted and transposed signals with said second constant frequency signals for retransposing said transmitted signals back to said first frequency range, a second record carrier adapted to have said retransposed signals recorded thereon, second recording means for recording said retransposed signals on said second record carrier, said second recording means being moved in said predetermined oscillatory manner with respect to said second record carrier to demodulate said retransposed signals and record said demodulated signals on said second record carrier, and reproducing means for reproducing said recorded and demodulated signals to provide the information transmitted by said electrical signals.

6. In a system for the transmission and reception of information by electrical signals, in combination, a transmitting station including a first record carrier adapted to have recorded thereon the electrical signals containing the information to be transmitted, first recording means for recording electrical signals on said first record carrier in a first frequency range, first reproducing means for reproducing said recorded signals, said first reproducing means being moved in a predetermined oscillatory manner with respect to said record carrier to modulate said reproduced signals in accordance with said predetermined oscillatory movement, a first oscillator for producing first constant frequency signals, first mixing means for mixing said modulated signals with said first constant frequency signals to transpose said modulated signals to a second frequency range, a second record carrier adapted to have said transposed electrical signals recorded thereon, second recording means for recording said transposed signals on said second record carrier, second reproducing means for reproducing said transposed signals, said second reproducing means being moved in a second oscillatory manner with respect to said record carrier to further modulate said transposed signals in accordance with said second oscillatory movement, and means adapted to transmit said further modulated signals; and at least one receiving station including a third record carrier adapted to have recorded thereon said further modulated transmitted signals, third recording means for recording said further modulated transmitted signals on said third record carrier, said third recording means being moved in said second oscillatory manner with respect to said third record carrier to demodulate said further modulated signals to provide on said third record carrier said transposed frequency signals, third reproducing means for reproducing said transposed signals from said third record carrier, a second oscillator for producing second constant frequency signals equal to said first produced constant frequency signals, second mixing means for mixing said transposed signals with said second constant frequency signals for retransposing said signals back to said first frequency range, a fourth record carrier adapted to have recorded thereon said retransposed electrical signals, fourth recording means for recording said retransposed signals on said fourth record carrier, said fourth recording means being moved in said predetermined oscillatory manner to demodulate said retransposed signals and to record the same on said fourth record carrier, and fourth reproducing means for reproducing said recorded and demodulated signals to provide the information transmitted by said electrical signals.

7. In a transmitting station for use in a system for the transmission and reception of information by electrical signals, in combination, first recording means for recording the electrical signals containing the information being transmitted; first reproducing and modulating means for reproducing and modulating said recorded electrical signals; an oscillator for producing constant frequency signals; second recording means for recording said constant frequency signals; second reproducing and modulating means for reproducing and modulating said recorded constant frequency signals; mixing means for heterodyning and inverting said first mentioned modulated signals with said modulated constant frequency signals for providing heterodyned inverted signals; and means adapted to transmit said heterodyned inverted signals.

8. In a transmitting station for use in a system for the transmission and reception of information by electrical signals, in combination, a first record carrier adapted to have recorded thereon the electrical signals containing the information being transmitted; first recording means for recording said electrical signal on said first record carrier; fisrt reproducing means for reproducing said recorded electrical signals, said first reproducing means being moved in a first oscillatory manner with respect to said first record carrier to modulate said reproduced signals in accordance with said first oscillatory movement; an oscillator for producing constant frequency signals; a second record carrier adapted to have recorded thereon said constant frequency signals; second recording means for recording said constant frequency signals on said second record carrier; second reproducing means for reproducing said recorded constant frequency signals, said second reproducing means being moved in a second oscillatory manner with respect to said second record carrier to modulate said reproduced constant frequency signals in accordance with said second oscillatory movement; mixing means for heterodyning said first mentioned modulated signals with said modulated constant frequency signals for providing heterodyned signals; and means adapted to transmit said heterodyned signals.

9. A method for scrambling and unscrambling electrical signals in a system for the transmission and reception of information by electrical signals comprising the steps of recording the electrical signals to be transmitted; simultaneously reproducing and modulating said recorded electrical signals in accordance with a first modulation pattern; recording said reproduced and modulated electrical signals; simultaneously reproducing and further modulating said modulated signals in accordance with a second modulation pattern; transmitting said further modulated signals to a receiving station; a simultaneously recording and demodulating said transmitted electrical signals, said demodulation being carried out in accordance with said second modulation pattern; reproducing said demodulated electrical signals; simultaneously recording and further demodulating said last mentioned electrical signals, said further demodulation being carried out in accordance with said first modulation pattern; and reproducing said last mentioned recorded electrical signals to provide the information transmitted thereby.

10. A method for scrambling and unscrambling electrical signals in a system for the transmission and reception of information by electrical signals comprising the steps of recording the electrical signals to be transmitted in a first frequency range; simultaneously reproducing and modulating said recorded electrical signals in accordance with a first modulation pattern; heterodyning said modulated signals with a constant frequency electrical signal to transpose said modulated signals into a second frequency range; recording said transposed electrical signals; simultaneously reproducing and further modulating said transposed signals in accordance with a second modulation pattern; transmitting said further modulated signals to a receiving station; simultaneously recording and demodulating said transmitted electrical signals, said demodulation being carried out in accordance with said second modulation pattern; reproducing said demodulated electrical signals; heterodyning said demodulated electrical signals with a constant frequency electrical signal to retranspose said modulated signals back into said first frequency range; simultaneously recording and further demodulating said last mentioned reproduced electrical signals, said further demodulation being carried out in accordance with said first modulation pattern; and reproducing said last mentioned recorded electrical signals to provide the information transmitted thereby.

References Cited in the file of this patent

UNITED STATES PATENTS 2,406,350 Harrison --------------- Aug. 27, 1946